(12) United States Patent
Chadwick et al.

(10) Patent No.: US 11,197,161 B2
(45) Date of Patent: Dec. 7, 2021

(54) SYSTEM AND METHOD FOR CONNECTIVITY MANAGEMENT

(71) Applicant: Arm Cloud Services Limited, Glasgow (GB)

(72) Inventors: Nigel Chadwick, Cambridge (GB); Alan Tait, Cambridge (GB); Kevin McDowall, Cambridge (GB); Niall Strachan, Cambridge (GB); Peter Kinnaird, Cambridge (GB); Daniel Bell, Cambridge (GB); Susan McGhee, Cambridge (GB)

(73) Assignee: ARM CLOUD SERVICES LIMITED, Glasgow (GB)

( * ) Notice: Subject to any disclaimer, the term of this patent is extended or adjusted under 35 U.S.C. 154(b) by 0 days.

(21) Appl. No.: 16/971,895

(22) PCT Filed: Feb. 21, 2019

(86) PCT No.: PCT/GB2019/050481
§ 371 (c)(1),
(2) Date: Aug. 21, 2020

(87) PCT Pub. No.: WO2019/162678
PCT Pub. Date: Aug. 29, 2019

(65) Prior Publication Data
US 2021/0112401 A1    Apr. 15, 2021

(30) Foreign Application Priority Data

Feb. 22, 2018  (GB) ...................................... 1802903

(51) Int. Cl.
*H04W 12/72* (2021.01)
*H04W 12/40* (2021.01)
*H04W 12/50* (2021.01)

(52) U.S. Cl.
CPC ........... *H04W 12/40* (2021.01); *H04W 12/50* (2021.01); *H04W 12/72* (2021.01)

(58) Field of Classification Search
CPC ..... H04W 8/205; H04W 12/06; H04W 8/183; H04W 12/35
See application file for complete search history.

(56) References Cited

U.S. PATENT DOCUMENTS

2015/0303966 A1  10/2015 Lee et al.
2015/0350877 A1  12/2015 Li et al.
(Continued)

OTHER PUBLICATIONS

Gsma et al., "GSM Association Non-Confidential Official Document SGP.02—Remote Provisioning Architecture for Embedded UICC Technical Specification Remote Provisioning Architecture for Embedded UICC Technical Specification Security Classification: Non-confidential GSM Association Non-confidential Remote Provision," Jun. 27, 2017, XP055578321, paragrah [2.2.4], p. 39, paragraph 3.1.1; figure 11, p. 17; figure 2.
(Continued)

*Primary Examiner* — Michael T Vu
(74) *Attorney, Agent, or Firm* — Leveque Intellectual Property Law, PC

(57) ABSTRACT

A method or system for provisioning an embedded universal integrated circuit card "eUICC" profile to an eUICC enabled SIM. The provisioning comprising, providing an always provisioned international mobile subscriber identity "IMSI" to the SIM, activating abase profile integrated circuit card identifier "ICCID" on the SIM, activating a selected eUICC profile with a network operator, and instructing downloading of the eUICC profile to the SIM by the network operator.

22 Claims, 4 Drawing Sheets

(56) References Cited

U.S. PATENT DOCUMENTS

2017/0048713 A1    2/2017  Guday et al.
2018/0014178 A1*  1/2018  Baek ........................ H04W 8/20
2019/0053040 A1*  2/2019  Long ..................... H04W 12/06

OTHER PUBLICATIONS

Etsi: Smart Cards; Embedded UICC; Requirements Specification; Release 12, Feb. 1, 2013, XP055578369, p. 6, line 12.

* cited by examiner

SYSTEM AND METHOD FOR CONNECTIVITY MANAGEMENT

This application is the National Stage filing under 35 U.S.C. 371 of International Application No. PCT/GB2019/050481 filed Feb. 21, 2019, which claims the benefit of GB Application No. 1802903.3 filed Feb. 22, 2018, the contents of which are all hereby incorporated by reference herein in their entirety.

The present application relates to a system and method for connectivity management, particularly for machine to machine communication for connected devices and objects.

BACKGROUND

There is an increasing interest in the equipping of devices with wireless data connections. These wireless data connections can then be used, for example, for the automatic reporting of data by the devices and sending of data and instructions to the devices. Such wireless connected devices and their connectivity are commonly referred to as the Internet of Things (IoT), and may also be referred to as machine to machine (M2M) communication. Typically, the wireless data connections are provided by attaching physical elements, such as SIM cards, to the individual devices. Devices with M2M or IoT connectivity are commonly electronic devices comprising one or more sensors, but in principle this connectivity can be provided to any device or object.

In order to equip objects and devices with the necessary wireless connectivity desired by end user customers, for example to provide desired M2M or IoT functionality, it is necessary to provision subscriber SIM cards of IOT devices to allow them to access the different wireless networks operated by various Mobile Network Operators (MNOs). Wireless connectivity is used to refer to both the wireless services which are available and the geographical area in which they are available. In practice, each wireless network generally has a limited geographical coverage, and different MNOs may offer and support different services through their respective wireless networks, so that it is commonly necessary for a single M2M or IoT device to be able to access multiple different wireless networks operated by different Mobile Network Operators (MNOs) in order to provide the wireless connectivity desired by end user customers.

Currently, an MNO operating a 3rd Generation Partnership Project (3GPP) and/or Global System for Mobile Communications (GSM) standard compliant wireless network will use the core network elements of a Home Location Register (HLR) and a Home Subscriber Server (HSS) to provision a SIM to operate as a subscriber to the MNO's core network infrastructure and allow the SIM access to the Radio Access Network (RAN).

End users in the M2M or IoT industry generally use the services of Connectivity Management Platforms (CMP) to manage their relationships with the MNOs on their behalf, in order to reduce complexity and expedite time to market for the end users, who will typically be deploying large numbers of SIM cards.

A number of different Connectivity Management Platforms (CMP) exist, offering various integration approaches to control the process of provisioning subscriber SIM cards of IOT devices in order to enable the subscriber SIM cards to access the different wireless networks operated by the various MNOs.

The currently operating CMPs all follow a similar methodology for remote provisioning. These CMPs are generally provided on a per-operator basis, where each CMP provides provisioning for access to the network of a single MNO, due to the nature of GSM/3GPP where each MNO has a core network which a subscriber SIM card needs to be provisioned on to. However, there are some groups and alliances where a number of MNOs are connected by an inter-operator agreement which allow roaming between their networks, so that these operators allow provisioning onto the networks covered by the agreement to be provided by a single CMP.

The CMPs control the subscriber lifecycle of subscriber SIM cards and typically have the ability to modify various settings to configure network access behavior on a per subscriber basis throughout the lifetime of the subscriber SIM card being utilised. These modifiable settings may include Integrated Circuit Card Identifier (ICCID) and Mobile Subscriber Integrated Services Digital Network Number (MSISDN) pairing, International Mobile Equipment Identity (IMEI) Registration, Roaming Agreements for out of region connectivity, Services such as Voice or SMS, access to different data bearers, and Access Point Names (APNs).

Different CMPs organize and carry out the provision of their services in different ways to enable subscriber SIM cards to provide the desired connectivity services to end users. In general CMPs use a methodology which allows a subscriber SIM card that belongs to a single MNO to be provisioned remotely by a CMP by an integration with 3GPP elements that control the configuration of each subscriber SIM card.

By design, under the GSM Association (GSMA) standard, MNO SIM cards are only available to be provisioned on their own home network with a single core network. This limitation has been seen as a commercial obstacle in some telecommunications industries, and as a result a number of technical or commercial solutions to allow use of a SIM card on other networks than the SIM card MNO home network have been developed. These solutions include roaming, where a SIM card is allowed to use other MNO networks through an inter-operator commercial wholesale agreement, and Multi International Mobile Subscriber Identity (IMSI), where the physical SIM card may be provisioned with multiple IMSIs that can be "changed" remotely. However, these solutions are dependent on the Mobile Network Connectivity Service Providers (CSPs) enabling these services through a commercial relationship or through some bespoke non-standardised approach. As a result, these solutions may not always be available. In addition, some MNO Group Operators which operate more than one wireless network may also allow a SIM card to access all of their multiple networks in order to provide a larger geographical "footprint" of coverage, but this is limited to the wireless networks controlled by the MNO Group Operator. As a result there is a problem that a SIM card can only be provisioned onto a relatively small number of wireless networks linked to a specific MNO, this is commonly referred to as "vendor lock in".

In an attempt to provide a SIM the capability to be connected to any wireless network, and to enable a standardized model for global wireless connectivity, the Embedded Universal Integrated Circuit Card (eUICC) has been created and agreed as a model supported by MNOs. The eUICC technology allows a user to remotely provision over the air (OTA) an eUICC enabled physical SIM to be able to access a network of an MNO even when the SIM does not belong to that MNO. This process removes vendor lock in between the physical SIM and the required network access provided by the MNO by allowing the end user (or device)

to select the provider of their connectivity after the physical SIM has been procured and/or deployed. The OTA Remote Subscription Provisioning (RSP) is a 3GPP standard and is provided by several providers.

This eUICC OTA provisioning process can be performed as required throughout the lifetime of a physical SIM, enabling the SIM to have new connectivity services added that belong to different MNOs for either service availability/ coverage or commercial reasons, and to have redundant connectivity services removed. There are currently two GSMA specifications to handle remote subscription management, M2M and Consumer Devices. The M2M eUICC process defines and uses two key new network elements, Subscription Manager Data Preparation (SM-DP) which securely creates and packages profiles, and manages the installation and enabling of the profiles on the eUICC, and Subscription Manager Secure Routing (SM-SR) which ensures the secure transport of both the eUICC platform and eUICC profile management commands in order to load, enable, disable and delete profiles on the eUICC. The consumer devices eUICC process comprises of a single network element, Subscription Manager Data Preparation (SM-DP$_+$) and introduces a Local Profile Assistant (LPA) which is part of the physical device. The role of the LPA is to initiate the profile download and control the appropriate required actions on the eUICC. The GSMA Consumer Devices specification is intended to allow the end user to act as a decision maker to initiate the download directly from the device.

However, there are problems with this approach. Existing implementations of current approaches to provide eUICC enabled connectivity solutions suffer from two main drawbacks. Firstly, there is a requirement for the orchestration of two physically disparate systems from both the MNO and the SM-SR provider, specifically, the HLR/HSS or CMP and the instructions to the SM-SR, or the SM-DP$_+$ and the LPA, prior to providing connectivity services to the SIM. This disconnect leads to a range of problems and inefficiencies. Further, the existing implementations are complex, and require the end user to make some decisions regarding providers, options and deployment methods for the SIM card before the SIM card is deployed.

One problem is that currently available solutions do not have interoperability between the different vendors, that is, SM-SR and SM-SP providers, that offer these solutions, so that despite the intention that eUICC should provide a technical approach to eliminate vendor lock in the end user is required to choose a range of service options that is specific to one vendor. This reduces the range of flexibility open to the end user and the data output provided by their future operations as they move forwards.

Another problem is that in order to provide the full range of wireless services and geographical coverage desired by end users it is still generally necessary to deal with multiple MNOs, who generally have different non-standard connectivity interfaces which are not interoperable. Further, the IoT software and solutions market is very diverse with many different wireless access technologies. As a result, there may be a fragmented buying decision for the end user where they may end up utilizing different implementations, which may be provided by different vendors, across different connectivity solutions even within the same standards body. e.g. 3GPP and the use cases of LTE-CAT-NB1 (NB-IoT) and LTE-CAT-M1 (eMTC). As a result of this fragmented buying decision many end users are being forced into making a decision to sacrifice vendor choice and longer term flexibility in favor of a simplified deployment process which will quickly get their M2M or IoT devices and services up and running.

Further problems are that, time to market for M2M and IoT end users is delayed by the complex requirements to set up, support, deploy and manage the necessary vendor relationships to provide global network connectivity. The need to arrange the necessary network infrastructure can be perceived as a high cost barrier to entry by many, as well as being technically challenging. Further, M2M and IoT device lifecycles can be difficult to manage and vary massively depending on sector. Further, it is difficult to find meaningful information on connection and subscriber performance for M2M and IoT devices, which may be essential for troubleshooting. Further, traditional management solutions don't scale to meet the challenge.

Another problem is the lack of vendor interoperability for the SM-SR and SM-DP element of eUICC management. The GSMA 3GPP standard states that different providers profiles should be interoperable with each other through the SM-DP and SM-SR communicating through specified 3GPP defined interfaces. However, currently this is not the case. Each SM-SR and SM-DP provider will support these specified interfaces. However the SM-SR and SM-DP providers generally also include proprietary functionality that creates a set of siloed solutions which cannot be utilized with another vendors solution in an interoperable manner. This forces users to make a choice between different MNOs and their product and service offerings, leading in practice to continued vendor lock in, and reducing the attractiveness of adoption of eUICC technology.

The embodiments described below are not limited to implementations which solve any or all of the disadvantages of the known approaches described above.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A system and method is provided for provisioning an embedded universal integrated circuit card "eUICC" profile to a subscriber interface module "SIM" using an always provisioned international mobile subscriber identity "IMSI" on the SIM.

In a first aspect, the present disclosure provides a method of provisioning an embedded universal integrated circuit card "eUICC" profile to an eUICC enabled subscriber interface module "SIM", the method comprising: providing an always provisioned international mobile subscriber identity "IMSI" to the SIM; activating a base profile integrated circuit card identifier "ICCID" on the SIM; activating a selected eUICC profile with a network operator; and instructing downloading of the eUICC profile to the SIM by the network operator.

In a second aspect, the present disclosure provides a connectivity management platform "CMP" system comprising: means arranged to provide an always provisioned international mobile subscriber identity "IMSI" to an embedded universal integrated circuit card "eUICC" enabled SIM; means arranged to activate a base profile integrated circuit card identifier "ICCID" on the SIM; means arranged to activate a selected eUICC profile with a network operator; and means arranged to instruct downloading of the eUICC profile to the SIM by the network operator.

In a third aspect, the present disclosure provides a computer program comprising computer readable instructions which, when executed by a processor of a computer cause the computer to carry out the method of the first aspect.

In a further aspect, the present disclosure provides a method of provisioning an embedded universal integrated circuit card "eUICC" profile to a SIM card, the method comprising: providing an always provisioned international mobile subscriber identity "IMSI" to the SIM card; activating a base profile integrated circuit card identifier "ICCID" on the SIM card; activating a selected eUICC profile with a network operator; and instructing downloading of the eUICC profile to the SIM card by the network operator.

In a still further aspect, the present disclosure provides a connectivity management platform "CMP" system comprising: means arranged to provide an always provisioned international mobile subscriber identity "IMSI" to a SIM card; means arranged to activate a base profile integrated circuit card identifier "ICCID" on the SIM card; means arranged to activate a selected eUICC profile with a network operator; and means arranged to instruct downloading of the eUICC profile to the SIM card by the network operator.

In a yet further aspect, the present disclosure provides a computer program comprising computer readable instructions which, when executed by a processor of a computer cause the computer to carry out the method of the further aspect.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc. and do not include propagated signals. The software can be suitable for execution on a parallel processor or a serial processor such that the method steps may be carried out in any suitable order, or simultaneously.

This application acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
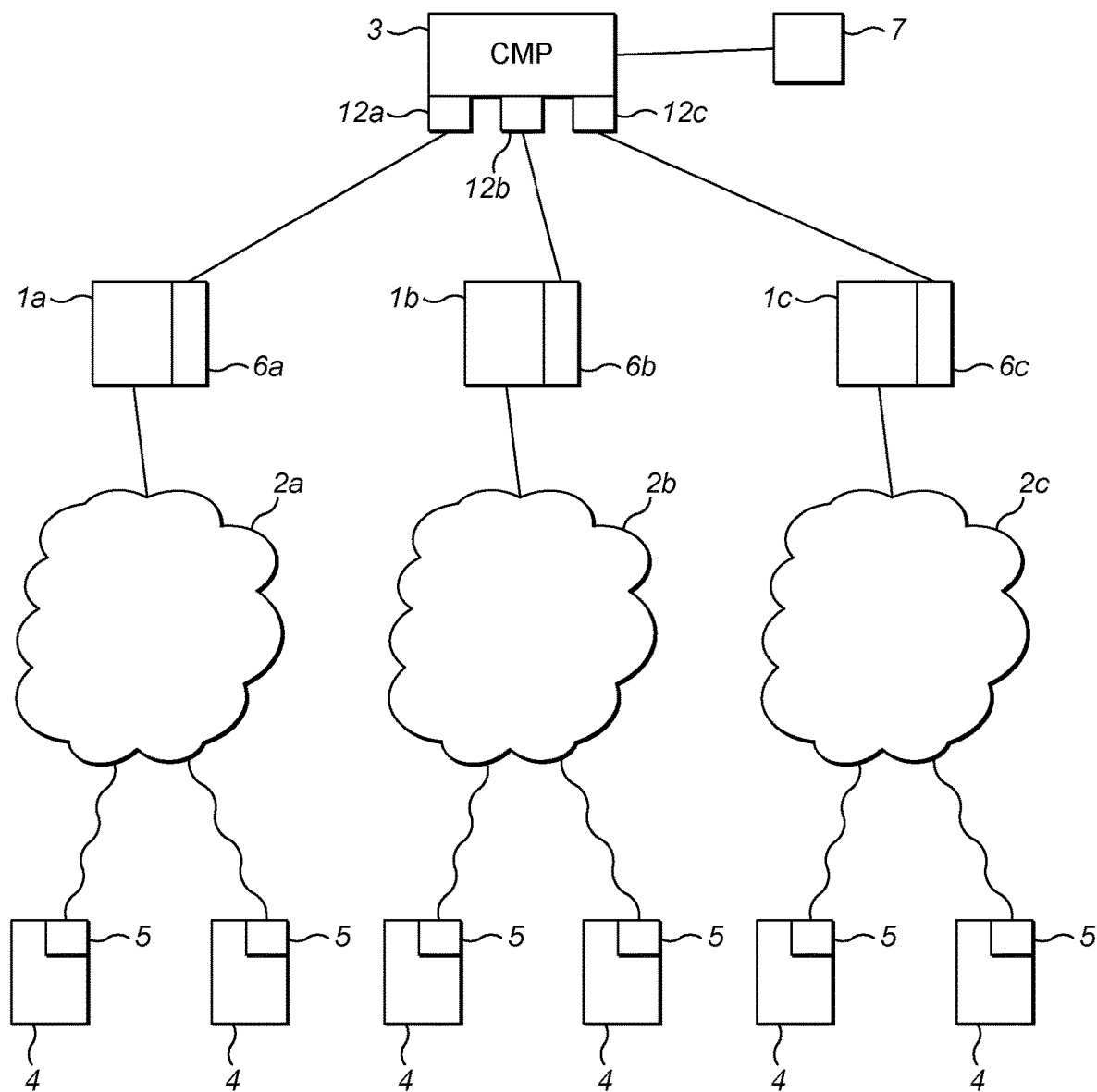
FIG. 1 is an explanatory diagram of connectivity management platform according to an embodiment.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

FIG. 1 shows a diagrammatic illustration of an improved connectivity management platform (CMP) according to an embodiment of the present invention.

As shown in FIG. 1 a plurality of different Mobile Network Operators (MNOs) 1a to 1c each operate a corresponding wireless mobile communications network 2a to 2c. In FIG. 1 the networks 2a to 2c are shown spaced apart for clarity, but it will be understood that the geographical extent of the different networks 2a to 2c may in practice partially or completely overlap one another.

An improved connectivity management platform (CMP) 3 according to the present disclosure offers Machine to Machine (M2M) or Internet of Things (IoT) wireless connectivity services to end user subscribers. The end user subscribers each have, or wish to deploy, a plurality of M2M or IoT devices 4, each equipped with an eUICC enabled subscriber identity module (SIM) 5 which require wireless connection to various ones of the wireless networks 2a to 2c in order to provide the M2M or IoT functionality desired by the different end user subscribers. An eUICC enabled SIM may also be referred to as eUICC, an eUICC card, or an eSIM.

In the illustrated example the SIM 5 is a SIM card. However, this is not essential. In other examples the SIM 5 may, for example, be an integrated circuit, or chip, embedded in or attached to the device 4, or may be integrated into one or more components of the device 4.

The CMP 3 offers a range of wireless connectivity service options to end user subscribers, who are customers of the CMP 3. These wireless connectivity services offered by the CMP 3 provide suitable connectivity for M2M or IoT services, and are commonly defined in terms of different tariffs, where each tariff is a combination of a product, a coverage, and a rate, and each tariff is provided by a specific one of the MNOs 1a to 1c. In a tariff, the product is the wireless connectivity service provided, the coverage is the geographical area in which the service is available, and the rate is the cost of the service.

The CMP 3 provides a customer interface allowing end user subscriber customers to interact with the CMP 3 and to access the functionality of the CMP 3. Customers can use the customer interface of the CMP 3 to review available IoT tariffs offered by the CMP 3 and to select and activate desired tariffs for the SIM cards 5 of the customers IoT devices 4. The customer interface provides remote access to the CMP 3 to customers and may comprise a graphical user interface (GUI) comprising a number of interactive screens which can be remotely accessed by customers, for example by using browsers on respective customer computing devices 7. Alternatively, the customer interface may take the form of a plurality of APIs remotely accessible to a customer computer. The CMP 3 may comprise a server making the customer interface available to customers through a communications network such as the Internet.

In order to be able to offer the different tariffs to the end user customers and to provide the desired IoT functionality to the IoT devices 4, the CMP 3 is arranged to communicate with each of the plurality of different Mobile Network Operators (MNOs) 1a to 1c. The CMP 3 is arranged to communicate with respective provisioning interfaces 6a to 6c of the different MNOs 1a to 1c in order to allow the CMP 3 to request specific ones of the MNOs 1 to provision specific ones of the SIM cards 5 of the IoT devices 4 to receive specific wireless connectivity services from the MNOs 1. Only three different MNOs 1a to 1c are shown in FIG. 1 for clarity, but it will be understood that in practice the CMP 3 may be arranged for communication with any number of MNOs 1. In practice it may be necessary for the CMP 3 to communication with a large number of MNOs 1 in order to provide the IoT functionality desired by the different customers.

Figure 2:
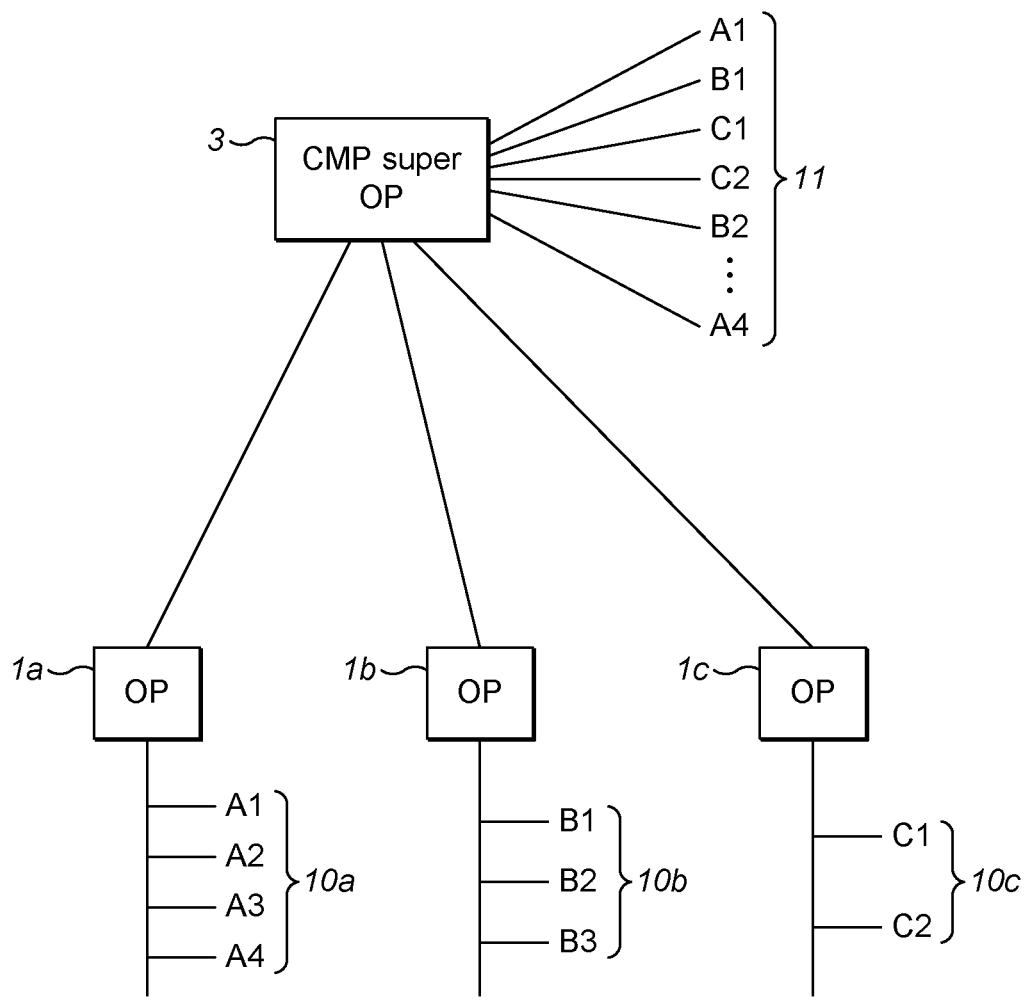
FIG. 2 is an explanatory diagram of a super operator functionality of the connectivity management platform of FIG. 1.

The CMP 3 is arranged to act as a super operator linking the different MNOs 1, as shown in FIG. 2. FIG. 2 shows a diagrammatic illustration of the CMP 3 acting as a super operator according to the embodiment of FIG. 1.

As shown in FIG. 2, each of the MNOs 1a to 1c are network operators and offer a number of different tariffs to users. A first MNO 1a offers a first operator tariff group 10a comprising four different tariffs A1 to A4, a second MNO 1b offers a second operator tariff group 10b comprising three different tariffs B1 to B3, and a third MNO 1c offers a third operator tariff group 10c comprising three different tariffs C1 to C3. The CMP 3 acts as a higher level super operator overlying and linking together the different operator MNOs 1a to 1c. The CMP 3 super operator has a parent-child relationship with the operators below it. In other words, the CMP 3 super operator has a 1:N relationship with multiple operators MNOs 1a to 1c. The CMP 3 super operator obtains details of the tariffs offered by the different operators 1a to 1c, and links each of the tariffs to an available eUICC profile. The CMP 3 super operator then offers to customers a combined tariff group 11 comprising all of tariffs in the different operator tariffs groups 10a to 10c offered by the different MNOs 1a to 1c in combination, and comprising tariffs A1 to A4, B1 to B3, and C1 to C3. Although each super operator has a 1:N relationship with multiple operators, in some examples the CMP 3 may support a plurality of different super operators simultaneously and in such examples it is possible that some MNOs could be linked to more than one super operator.

It will be understood that the number of tariffs offered by the different operator MNOs is an explanatory example only. In practice an MNO can offer any number of tariffs.

In operation of the CMP 3, a customer can use the customer interface of the CMP 3 to review the available tariffs in the combined tariff group 11 and select the tariff or tariffs required to provide the desired IoT functionality for a SIM card 5 of an IoT device 4 controlled by the customer. When multiple tariffs are selected these may include tariffs provided by different ones of the operator MNOs 1a to 1c. The tariff selection may be carried out for new SIM cards 5 which are about to be deployed to select the new tariffs to be available to these SIM cards 5, or may be carried out for SIM cards 5 already in operation to change some or all of the tariffs available to the SIM cars 5 by adding new tariffs and/or removing existing tariffs.

When a customer has selected a tariff or tariffs for a SIM card 5 from the combined tariff group 11, the CMP 3 can interface with the operator MNO 1a to 1c offering the selected tariff in their operator tariff group 10a to 10c in order to make a request for provisioning the selected tariff for the SIM card 5 to the provisioning interface 6a to 6c of that MNO 1a to 1c. In order to enable this, the CMP 3 comprises a plurality of provisioning adaptors 12a to 12c. Each of the adaptors 12a to 12c communicates with a specific one of the provisioning interfaces 6a to 6c of the MNOs 1a to 1c, and is arranged to create a tariff request that is correctly matched to the requirements of the corresponding provisioning interface 6a to 6c. The adaptors 12 may, for example, be software modules.

In order to allow the IoT devices 4 and their associated SIM cards 5 to be correctly associated with the different selected tariffs from different MNOs irrespective of the network technology used, device type or MNO identity the CMP 3 views each of the SIM cards 5, and thus the associated IoT device 4, as a globally unique object.

The CMP 3 super operator is an Embedded Universal Integrated Circuit Card (eUICC) provider and can provide Subscription Manager Secure Routing (SM-SR), enabling the downloading of profiles on to an eUICC. The CMP 3 is Global System Mobile Association (GSMA) eUICC compliant, enabling the CMP 3 to act as a decision making layer with Over-the-Air (OTA) profile management platforms to orchestrate and enable the deployment of eUICC profiles onto the physical SIM cards 5. When the customer uses the customer interface of the CMP 3 to request a SIM card 5 the CMP 3 assigns the user a SIM card 5 which has a unique Integrated Circuit Card Identifier (ICCID). The unique ICCID is assigned at the point of manufacture of the SIM card 5 and may be provided from a global pool of ICCIDs assigned to the CMP 3, or to the organization operating the CMP 3. It will be understood that the SIM card 5 may be manufactured and assigned the unique ICCID in advance and the SIM card 5 assigned to the user in response to the user request, or the SIM card 5 may be manufactured and assigned the unique ICCID in response to the user request. This unique ICCID is used as a master record by the CMP 3 to uniquely identify the SIM card 5 in all subsequent interactions with the CMP 3.

Accordingly, if the customer requires a SIM card 5 to be provided for incorporation into a customer IoT device 4 the customer can request issue of the SIM card 5 and the CMP 3 will automatically assign a suitable SIM card 5 controlled by the CMP 3 to the customer and provide the corresponding assigned ICCID itself. Alternatively, if the customer already has control of the SIM card 5, for example if the SIM card 5 has already been incorporated into a customer IoT device 4, the customer can use the customer interface of the CMP 3 to input identifying details of the SIM card 5. For example, if the SIM card 5 is a SIM card previously assigned to the customer by the CMP 3 or by another supplier, the customer can input the ICCID assigned to the SIM card 5 by the CMP 3, or the card supplier.

The CMP 3 provides the bootstrap connectivity for the selected SIM card 5 as an always provisioned International Mobile Subscriber Identity (IMSI) which is stored, in the records of the CMP 3 in association with, or tied to, a Mobile Subscriber Integrated Services Digital Network Number (MSISDN) and to the ICCID for that SIM card 5, which ICCID is used as the master record by the CMP 3.

When a customer uses the customer interface of the CMP 3 to select a tariff or tariffs for a SIM card 5, the CMP 3 checks the provided ICCID of the SIM card 5, which is the ICCID of the bootstrap SIM, and obtains all of the tariffs available to the CMP3 as a super operator from the linked operator MNOs 3a to 3c in the combined tariff group 11, and links these possible tariffs to available eUICC profiles.

In some examples the CMP 3 acting as a super operator may itself offer further tariffs in addition to those provided by the MNOs 3a to 3c. In other words, in some examples the CMP 3 may effectively act as an operator in addition to acting as a super operator for the linked operator MNOs 3a to 3c. In such examples the CMP 3 can offer these further tariffs as part of the combined tariff group 11.

When a customer uses the customer interface of the CMP 3 to select a tariff for the SIM card 5 the necessary profile required to support that tariff is mapped to the ICCID of the SIM card 5 and identified as part of the set of profiles associated with that SIM card 5. Where multiple tariffs are selected by the customer this process is repeated for each of the selected tariffs. Accordingly, when multiple tariffs are selected by the customer there may be multiple profiles in the set of profiles associated with the SIM card 5.

When all of the desired tariffs for the SIM 5 have been selected, the SIM 5 may be activated. In some examples this activation may be immediate, for example automatically when the customer indicates that the selection process is complete, or in response to the customer selecting an "activate" option using the customer interface of the CMP 3. In other examples the activation may take place some time after the tariff selection has been completed, and possibly a long time after. For example, the activation may be set to take place at a selected future time, or may take place in response to a customer activation instruction some time after the selection.

When the SIM card 5 is to be activated in response to a customer activation instruction the CMP 3 follows an activation process. This customer activation instruction may be a single click by the customer on an "activate" option on the customer interface of the CMP 3.

When the SIM card 5 is activated it will generally be necessary to activate one or more profiles on the SIM card 5 required in order to support the selected tariff or tariffs.

Figure 3:
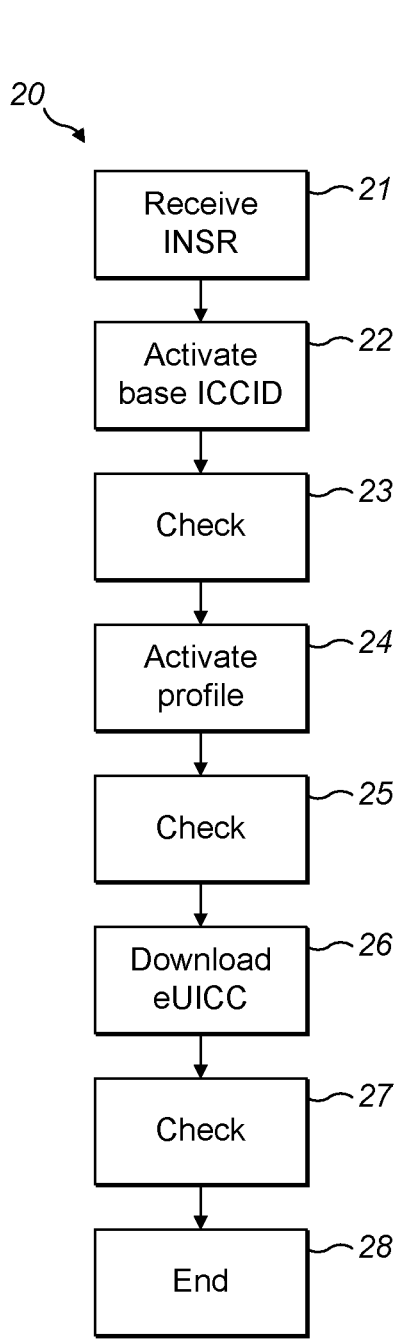
FIG. 3 is a flow diagram of single profile activation process useable by the connectivity management platform of FIG. 1.

The activation process followed by the CMP 3 for a single required profile is illustrated in FIG. 3. The activation process 20 starts when an activate instruction for a SIM card 5 having an assigned unique ICCID is received by the CMP 3 in a receive instruction step 21.

Next, the CMP 3 activates the base profile associated with the ICCID in an activate base ICCID step 22. Then the CMP 3 checks that the base profile has been activated in a check step 23. This base profile is associated with the always provisioned IMSI providing the bootstrap connectivity.

If the check step 23 confirms that the base profile has been activated, the CMP 3 then contacts the provisioning interface 6a to 6c of the appropriate one of the operator MNOs 1a to 1c and activates the required profile using the corresponding provisioning adaptor 12a to 12c of the CMP 3 in an activate profile step 24. Then the CMP 3 checks that the required profile has been activated in a check step 25.

If the check step 25 confirms that the required profile has been activated, the CMP 3 then contacts the provisioning interface 6a to 6c of the appropriate one of the operator MNOs 1a to 1c and triggers or instructs the Remote System Provisioning (RSP) eUICC download from the MNO 1a to 1c using the corresponding provisioning adaptor 12a to 12c of the CMP 3 in a download step 26. This downloads the required profile to the SIM card 5 using the eUICC OTA provisioning process. The MNO can carry out the eUICC OTA provisioning process via a Subscription Manager Secure Routing (SM-SR) of the MNO using an adaptor of the SM-SR/Subscription Manager Data Preparation (SM-DP) provider. The SM-SR/SM-DP provider may, for example, be the SIM manufacturer. Then the CMP 3 checks that the download has been successful in a check step 27.

If the check step 27 confirms that the download has been successful the process stops in an end step 29.

The SIM card 5 is then activated to provide wireless connectivity according to the selected tariff, providing the associated device 4 with the desired wireless communications functionality. Where the device 4 is an M2M or IoT device the SIM card 5 will provide the desired M2M or IoT wireless communications functionality.

In some examples a SIM card 5 may be activated to access multiple tariffs, so that it is necessary to upload multiple profiles to the SIM card 5. When this is required the activation process of FIG. 3 may be followed for each profile to be activated in turn. Alternatively, a multiple profile activation process may be followed.

Figure 4:
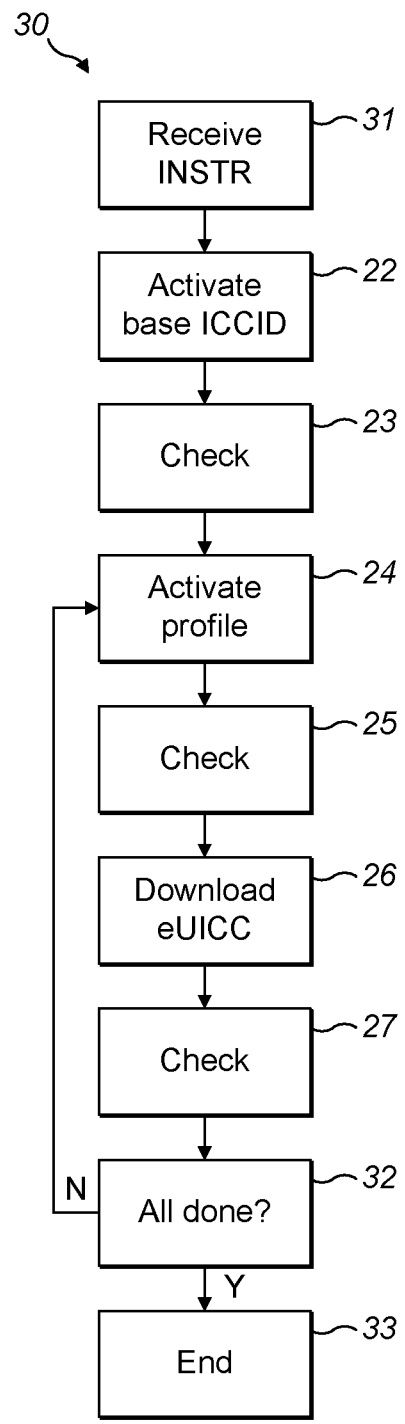
FIG. 4 is a flow diagram of multiple profile activation process useable by the connectivity management platform of FIG. 1.

The activation process followed by the CMP 3 for multiple required profiles is illustrated in FIG. 4. The activation process 30 starts when an activate instruction for a SIM card 5 having an assigned unique ICCID is received by the CMP 3 in a receive instruction step 31.

Next, the CMP 3 activates the base profile associated with the ICCID in an activate base ICCID step 22, and then checks that the base profile has been activated in a check step 23.

If the check step 23 confirms that the base profile has been activated, the CMP 3 then activates and downloads a required profile in steps 24 to 27 in the same manner as in the method 20.

The CMP 3 then checks whether any further required profiles need to downloaded in a further profiles step 32. If there are further profiles to be downloaded the CMP 3 returns to the profile activation step 24 to activate a next required profile. Alternatively, if there are no further profiles to be downloaded the process stops in an end step 33.

New profiles may be activated on SIM cards 5 when the SIM cards 5 are first activated for use, and may also be activated when the tariff or tariffs used by the SIM card 5 are to be changed, changing the wireless communications functionality provided by the SIM card 5.

In addition to downloading and activating new profiles, the CMP 3 can also delete profiles which are no longer to be used from the SIM cards 5.

Accordingly, the CMP 3 can fully control the subscriber lifecycle of the customer SIM cards 5 and their associated IoT devices.

Accordingly, an overview of the process may be summarized as starting with a customer ordering one or more bootstrap SIM cards 5 which each have an assigned ICCID and IMSI, which may be provided by the CMP 3 or already held by the customer. The ICCIDs and the IMSIs are stored by the CMP 3 in a global inventory and the CMP 3 assigns the ICCIDs to the customers account. Then, when the customer requests activation of the SIMs the CMP 3 can load any necessary eUICC profiles based on the ICCIDs.

As is explained above, the CMP 3 is able to provision SIM cards on multiple MNOs through the various MNO provisioning interfaces, and provides tariff selection services to make the selection of provisioning of SIMs simple and easy for end users. The CMP 3 is agnostic regarding network connectivity provide to the SIMs.

As is explained above, the CMP according to the present disclosure has eUICC functionality, and provides standards compliant integration to the Subscription Manager Secure Routing (SM-SR) and Subscription Manager Data Preparation (SM-DP) of the network operator MNOs, enabling the CMP to be the decision making layer for eUICC profile management, controlling the provisioning of eUICC profiles to the SIMs.

The capability to provide access to tariffs across multiple MNOs allows end user subscriber customers to utilize SIM cards issued by multiple networks, as well as electronic profiles from different partners, through a single CMP user interface. This capability allows the end users to manage the profiles that are available or applied to physical eSIMS themselves through a CMP user interface such as a GUI or suite of APIs.

The entire solution enables CMP to act as decision-making layer for the orchestration and enablement of eUICC profiles on physical SIM cards in a simple manner. The MNOs are then able to add and remove new profiles for commercial or coverage reasons to each end user account, thus enabling the end users to apply these to their deployed devices going forwards.

The integration to the SM-DP and SM-SR utilises the ES2 and ES4 API interface to achieve these management capabilities. However, it should be noted that all networks that are offered as an eUICC profile are integrated with the OSS/BSS systems of the MNO via a provisioning adaptor and with a full APN integration between the APN gateway and the network Packet Gateway systems using Radius as an Authentication, authorization and accounting (AAA) service and routable IP connectivity as part of a private Access Point Name (APN) configured on the network packet gateway and HLR/HSS.

Accordingly, the CMP provides end user subscribers with the advantage that they can deploy and manage all wireless connected IoT devices across the globe from the single CMP interface, regardless of the wireless connectivity type. Further, the devices and SIMS can be deployed using a single eUICC driven connectivity solution, eliminating the need to work with different network operators in different geographical regions. The CMP enables automation of device and SIM deployment, integration and ongoing management, allowing costs to be substantially reduced, and reducing time to market.

In addition to the SIM card and IoT device deployment described above, the CMP 3 may offer core infrastructure services in order to provide end user customers with more secure connectivity for their IoT devices.

Figure 5:
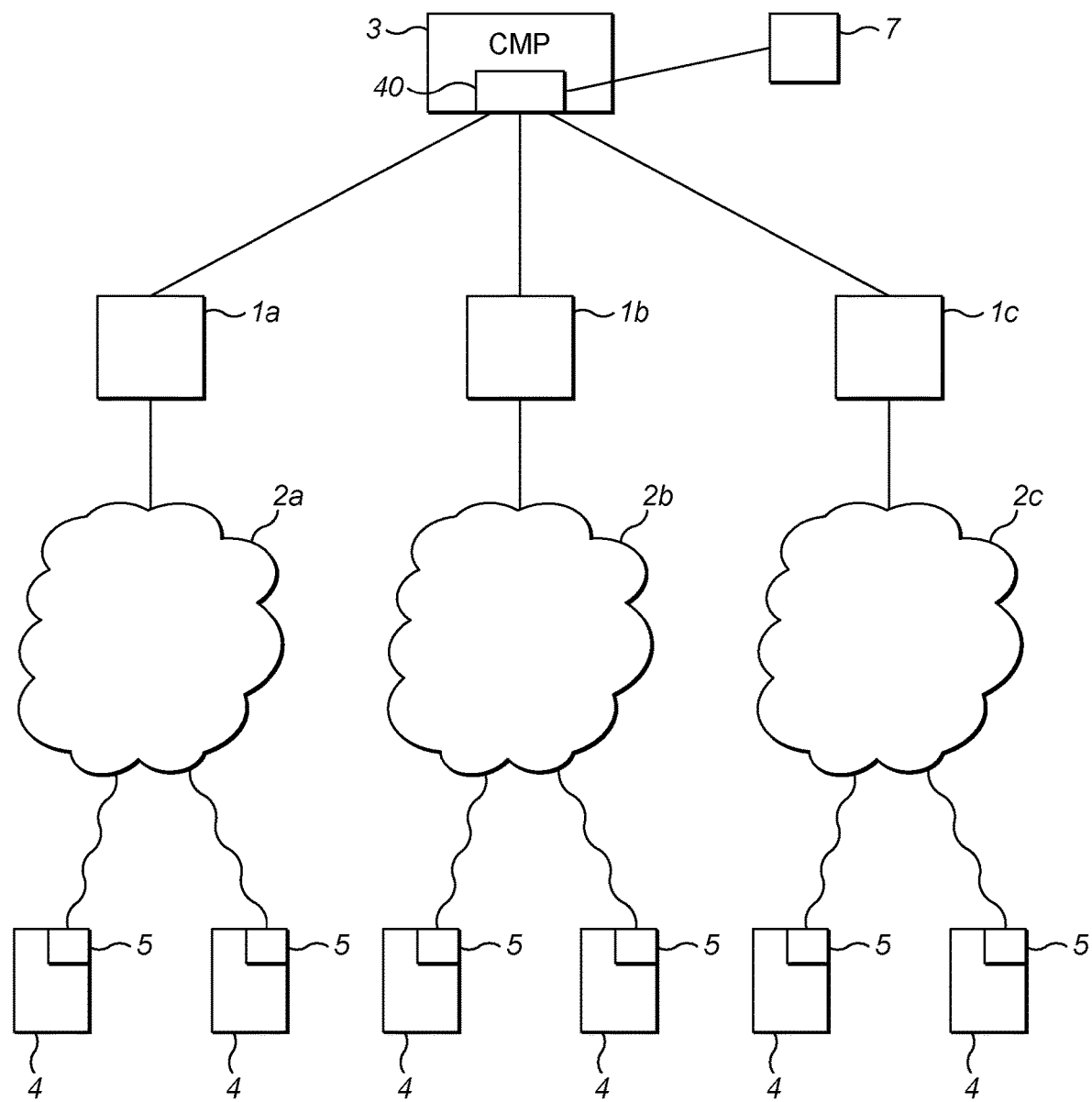
FIG. 5 is an explanatory diagram of a gateway functionality of the connectivity management platform of FIG. 1.

FIG. 5 shows a diagrammatic illustration of an improved connectivity management platform (CMP) according to an embodiment of the present invention.

As shown in FIG. 5, end user subscribers of a CMP 3 have a number of IoT devices 4 equipped with SIM cards 5. These IoT device 4 and SIM cards 5 communicate with different ones of a plurality of different wireless mobile communications networks 2a to 2c, each operated by a corresponding Mobile Network Operator (MNO) 1a to 1c. In FIG. 5 the networks 2a to 2c are shown spaced apart for clarity, but it will be understood that the geographical extent of the different networks 2a to 2c may in practice partially or completely overlap one another.

It is well known that security issues arise in any wireless communication system or communications network. However, these security issues may be particularly severe in IoT applications because communication between the IoT devices and end user subscribers may be particularly complex and subject to change. For example, an eSIM SIM card associated with an IoT device may provide connectivity through a specific MNO eUICC profile for Europe and route data from an EU peering point using an MNO assigned IP address, and then the IoT device may be moved so that the eSIM migrates from EU to the USA, have an US MNO eUICC profile applied, and then route data out from a US peering point and have a different IP address assigned by the US MNO.

The CMP 3 comprises a gateway 40 between the MNO networks 2a to 2c and end user subscriber devices 41. The end user subscriber devices may be an end user computer or computer network which stores and analyses data from the IoT devices 4.

The CMP 3 gateway 40 uses an Access Point Name (APN) method to route data and other communications between the SIM cards 5 of IoT devices 4 and the end user subscriber devices 41. The APN gateway 40 of the CMP 3 controls the access and routing of data of the respective end user subscriber, and provides a single access point for the end user subscriber to access data from the IoT devices 4.

The APN gateway 40 communications infrastructure is integrated into every eUICC enabled network that is offered by the CMP 3. Accordingly, data from the SIM cards 5 of the IoT devices 4 is routed back to the APN gateway 40 to allow single point peering or single IP per device communication regardless of the eUICC profile applied.

The CMP 3, and in particular APN gateway 40, is designed to provide a high availability fault tolerant data network for M2M and IoT applications. In order to enable this the APN gateway 40 is preferably designed with component redundancy, such as an N+1 redundancy scheme, and separation of tasks to enable key components to be scaled independently. This can provide improved performance, security and resilience, and provide a high degree of fault tolerance, performance and scalability.

The CMP 3 can support various encryption standards for communications between the SIM cards 5 of the IoT devices 4 and the end user subscriber devices 41, and can provide the end user subscribers with a Virtual Private Network (VPN).

For security reasons, the CMP 3 APN gateway 40 does not allow direct inbound connectivity to the end user subscriber devices 41 by default. However, end user subscribers may be provided with suitable access technology to access the IoT devices directly, if necessary. There CMP 3 may support a number of different communications options designed for ease of use, such as dedicated Internet Protocol (IP) links over Internet Protocol Security (IPsec) or Multiprotocol Label Switching (MPLS) protocols.

The CMP 3 may provide Infrastructure as a Service (IaaS). This allows customer's APNs to be hosted and routed and to take advantage of capabilities of the CMP 3 and data network. Providing private APN services to end user subscribers may provide a number of benefits. Security is one of the central benefits to a private APN. In particular, a private APN may be segregated from the public internet if desired. Such separation may be selected so that devices that are using the private APN are further secured from attacks from external parties. Such a private APN separated from the public internet can help to ensure that a private network remains private, since it is completely segregated from the public internet. This ensures that data cannot be accessed by external parties. Such a private APN separated from the public internet allows external parties to remotely connect to the private corporate network, which data integrity is assured since traffic between the remote device and corporate network does not traverse the public internet.

In the illustrated example three different MNOs, each operating a respective one of three different wireless networks is shown. In other examples there may be a different number of MNOs and/or wireless networks. In some examples one, some, or all of the MNOs may operate multiple wireless networks.

In the described embodiments the CMP functions as a super operator. In other examples the CMP may support multiple super operator entities.

The above description discusses embodiments of the invention with reference to a single customer for clarity. It will be understood that in practice the system may be shared by a plurality of customers, and possibly by a very large number of remote customers simultaneously.

The above description discusses embodiments of the invention with reference to providing IoT and/or M2M connectivity to customer devices for clarity. In other examples the invention may be used to provide SIM cards and devices with wireless communications connectivity for other applications.

The embodiment described above are fully automatic. In some alternative examples a user or operator of the system may instruct some steps of the method to be carried out.

In the illustrated embodiment the modules of the system are defined in software. In other examples the modules may be defined wholly or in part in hardware, for example by dedicated electronic circuits.

In the described embodiments of the invention the system may be implemented as any form of a computing and/or electronic device.

Such a device may comprise one or more processors which may be microprocessors, controllers or any other suitable type of processors for processing computer executable instructions to control the operation of the device in order to gather and record routing information. In some examples, for example where a system on a chip architecture is used, the processors may include one or more fixed function blocks (also referred to as accelerators) which implement a part of the method in hardware (rather than software or firmware). Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as a memory and communications media. Computer storage media, such as a memory, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media.

Although the system is shown as a single device it will be appreciated that this system may be distributed or located remotely and accessed via a network or other communication link (e.g. using a communication interface).

The term 'computer' is used herein to refer to any device with processing capability such that it can execute instructions. Those skilled in the art will realise that such processing capabilities are incorporated into many different devices and therefore the term 'computer' includes PCs, servers, mobile telephones, personal digital assistants and many other devices.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilising conventional techniques known to those skilled in the art that all, or a portion of the software instructions may be carried out by a dedicated circuit, such as a DSP, programmable logic array, or the like.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method steps or elements identified, but that such steps or elements do not comprise an exclusive list and a method or apparatus may contain additional steps or elements.

The order of the steps of the methods described herein is exemplary, but the steps may be carried out in any suitable order, or simultaneously where appropriate. Additionally, steps may be added or substituted in, or individual steps may be deleted from any of the methods without departing from the scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method of provisioning an embedded universal integrated circuit card (eUICC) profile to an eUICC enabled subscriber identity module (SIM), the method comprising:
   at a connectivity management platform (CMP):
      providing an always provisioned international mobile subscriber identity (IMSI) to the SIM, the always provisioned IMSI providing bootstrap connectivity to the SIM;
      activating a base profile integrated circuit card identifier (ICCID) on the SIM;
      activating a selected eUICC profile with a network operator; and instructing downloading of the eUICC profile to the SIM by the network operator.

2. The method of claim 1, in which the CMP acts as a super operator over the network operator.

3. The method of claim 2, in which the CMP has a parent-child or 1:N relationship with the network operator.

4. The method of claim 3, in which the CMP activates, via a provisioning interface, the Eselected eUICC profile and instructs downloading of the eUICC profile via a Subscription Manager Secure Routing (SM-SR) of the network operator using an adaptor of the SM-SR/Subscription Manager Data Preparation (SM-DP) provider.

5. The method of claim 2, in which the CMP acts as a super operator over a plurality of network operators.

6. The method of claim 2, in which each of a plurality of network operators offers one or more tariffs for communication services and the CMP offers users tariffs from each of the plurality of network operators.

7. The method of claim 6, in which the CMP offers users each of the one or more tariffs from each of the plurality of network operators.

8. The method of claim 6, in which the CMP uses the ICCID of the always provisioned IMSI as a master record to uniquely identify a specific SIM across all network operators and tariffs.

9. The method of claim 1, in which the SIM is associated with an internet of things (IoT) device to provide IoT or machine to machine (M2M) functionality.

10. The method of claim 1, in which the SIM is a SIM card.

11. A system comprising:
a connectivity management platform (CMP), including:
means arranged to provide an always provisioned international mobile subscriber identity (IMSI) to an embedded universal integrated circuit card (eUICC) enabled subscriber identity module (SIM), the always provisioned IMSI providing bootstrap connectivity to the SIM;
means arranged to activate a base profile integrated circuit card identifier (ICCID) on the SIM;
means arranged to activate a selected eUICC profile with a network operator; and
means arranged to instruct downloading of the eUICC profile to the SIM by the network operator.

12. The system of claim 11, in which the CMP is arranged to act as a super operator over the network operator.

13. The system of claim 12, in which the CMP has a parent-child or 1:N relationship with the network operator.

14. The system of claim 13, in which the CMP is arranged to activate, via a provisioning interface, the selected eUICC profile and instruct downloading of the eUICC profile via a Subscription Manager Secure Routing (SM-SR) of the network operator using an adaptor of the SM-SR/Subscription Manager Data Preparation (SM-DP) provider.

15. The system of claim 12, in which the CMP is arranged to act as a super operator over a plurality of network operators.

16. The system of claim 12, in which each of a plurality of network operators offers one or more tariffs for communication services and the CMP is arranged to offer users tariffs from each of the plurality of network operators.

17. The system of claim 16, in which the CMP is arranged to offer users each of the one or more tariffs from each of the plurality of network operators.

18. The system of claim 16, in which the CMP is arranged to use the ICCID of the always provisioned IMSI as a master record to uniquely identify a specific SIM across all network operators and tariffs.

19. The system of claim 11, in which the CMP comprises a gateway arranged to control communications between end user subscriber systems and the SIM.

20. The system of claim 19, in which the gateway is an access point name (APN) gateway.

21. The system of claim 11, in which the SIM is a SIM card.

22. A non-transitory computer readable medium storing computer readable instructions which, when executed by a processor of a computer, cause the computer to carry out the method of claim 1.

* * * * *